US011798188B2

(12) United States Patent
Chen et al.

(10) Patent No.: US 11,798,188 B2
(45) Date of Patent: Oct. 24, 2023

(54) APPARATUS AND METHOD OF REMOTELY MEASURING SIZE OF PUPIL

(71) Applicants: Tsinghua University, Beijing (CN); Nuctech Company Limited, Beijing (CN)

(72) Inventors: Zhiqiang Chen, Beijing (CN); Yuanjing Li, Beijing (CN); Jianmin Li, Beijing (CN); Xianghao Wu, Beijing (CN); Bin Liu, Beijing (CN); Guocheng An, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 28 days.

(21) Appl. No.: 17/622,496

(22) PCT Filed: Feb. 24, 2021

(86) PCT No.: PCT/CN2021/077606
§ 371 (c)(1),
(2) Date: Dec. 23, 2021

(87) PCT Pub. No.: WO2021/196924
PCT Pub. Date: Oct. 7, 2021

(65) Prior Publication Data
US 2022/0245807 A1 Aug. 4, 2022

(30) Foreign Application Priority Data
Mar. 31, 2020 (CN) .......................... 202010247940.6

(51) Int. Cl.
*G06V 40/18* (2022.01)
*G06T 7/62* (2017.01)
(Continued)

(52) U.S. Cl.
CPC .............. *G06T 7/62* (2017.01); *G06T 7/0012* (2013.01); *G06T 7/70* (2017.01); *G06T 7/90* (2017.01);
(Continued)

(58) Field of Classification Search
CPC .......... G06T 7/62; G06T 7/0012; G06T 7/70; G06T 7/90; G06T 2207/30041; G06V 40/162; G06V 40/18; G06V 40/193
See application file for complete search history.

(56) References Cited

U.S. PATENT DOCUMENTS 10,460,467 B2 * 10/2019 Akiyama .................. G06T 7/70
10,535,139 B1 * 1/2020 Poliakov .................. G06T 7/66
(Continued)

FOREIGN PATENT DOCUMENTS

CN 110151184 A 8/2019
CN 110393504 A 11/2019
(Continued)

OTHER PUBLICATIONS

Jinman Kim; Eui Chul Lee; and Jao Sang Lim: "A New Objective Visual Fatigue Measurement System by Using a Remote Infrared Camera"; 2011 Eighth International Joint Conference on Computer Science and Software Engineering (JCSSE); pp. 182-186. (Year: 2011).*
(Continued)

*Primary Examiner* — Siamak Harandi
(74) *Attorney, Agent, or Firm* — Merchant & Gould P.C.

(57) ABSTRACT

The present disclosure provides a method of remotely measuring a size of a pupil, including: acquiring an image of a to-be-measured person by using a detection device; acquiring an image of a pupil of the to-be-measured person from the image of the to-be-measured person; measuring a distance between the to-be-measured person and the detection
(Continued)

device by using the detection device; and calculating an actual size of the pupil of the to-be-measured person based on the measured distance and the image of the pupil of the to-be-measured person. The present disclosure further provides an apparatus for remotely measuring a size of a pupil, an electronic device, and a non-transitory computer-readable medium.

6 Claims, 4 Drawing Sheets

(51) Int. Cl.
G06T 7/90 (2017.01)
G06T 7/70 (2017.01)
G06V 40/16 (2022.01)
G06T 7/00 (2017.01)

(52) U.S. Cl.
CPC ............ *G06V 40/162* (2022.01); *G06V 40/18* (2022.01); *G06V 40/193* (2022.01); *G06T 2207/30041* (2013.01)

(56) References Cited

U.S. PATENT DOCUMENTS

2009/0148036 A1* 6/2009 Aoyama ................... G06T 7/70
382/154
2018/0286070 A1* 10/2018 Benedetto ................. G06T 7/62

FOREIGN PATENT DOCUMENTS

CN 110507281 A * 11/2019
CN 110507281 A 11/2019
KR 20070062617 A 6/2007

OTHER PUBLICATIONS

PCT International Search Report for PCT Application No. PCT/CN2021/077606 dated May 26, 2021 (5 pages, with English translation).
PCT Written Opinion for PCT Application No. PCT/CN2021/077606 dated May 26, 2021 (4 pages).

* cited by examiner

APPARATUS AND METHOD OF REMOTELY MEASURING SIZE OF PUPIL

CROSS-REFERENCE TO RELATED APPLICATIONS

This application is a National Stage Application of International Application No. PCT/CN2021/077606, filed on Feb. 24, 2021, entitled "APPARATUS AND METHOD OF REMOTELY MEASURING SIZE OF PUPIL", which claims priority to the Chinese Patent Application No. 202010247940.6, filed on Mar. 31, 2020, the content of which are incorporated herein by reference in their entirety.

TECHNICAL FIELD

The present disclosure relates to a field of warehouse logistics, and more specifically to a device of remotely measuring a size of a pupil, a method of remotely measuring a size of a pupil, an electronic device, and a computer-readable storage medium.

BACKGROUND

For a long time, in drug investigation, conventional test methods to check whether a suspect has taken drugs include tests of urine, blood or saliva. However, these tests include a plurality of links such as sampling under supervision and often consume a lot of time, manpower and material resources, and test results are prone to false negatives, false positives, etc. due to interference. Moreover, there are various kinds of drugs, and using urine test paper to check one by one may increase the use of urine test paper and increase costs, which is not suitable for extensive check.

In addition, in recent years, some drug addicts have adopted special methods to neutralize drug metabolism in their bodies, which makes routine urine tests ineffective. Investigators may only use accurate test methods such as gas chromatography, gas chromatography-mass spectrometry, etc. which may take 2 to 3 days with a high cost.

In view of these obvious drawbacks and a plurality of problems in the tests of drug addicts, there is a need to provide a safe and simple technology of remotely and imperceptibly determining a suspicion of drug-taking.

SUMMARY

In a first aspect of the embodiments of the present disclosure, there is provided a method of remotely measuring a size of a pupil, including: acquiring an image of a to-be-measured person by using a detection device; acquiring an image of a pupil of the to-be-measured person from the image of the to-be-measured person; measuring a distance between the to-be-measured person and the detection device by using the detection device; and calculating an actual size of the pupil of the to-be-measured person based on the measured distance and the image of the pupil of the to-be-measured person.

According to the first aspect, the calculating an actual size of the pupil of the to-be-measured person based on the measured distance and the image of the pupil of the to-be-measured person may include: calculating the actual size of the pupil of the to-be-measured person based on the measured distance and a size of pixels occupied by the image of the pupil of the to-be-measured person in the image of the to-be-measured person.

According to the first aspect, a ratio of the actual size of the pupil of the to-be-measured person to the size of pixels occupied by the image of the pupil of the to-be-measured person in the image of the to-be-measured person is proportional to the measured distance.

According to the first aspect, the image of the pupil is acquired by at least one of a plurality of image capture devices arranged in a first array in the detection device.

According to the first aspect, the distance between the to-be-measured person and the detection device is acquired by at least one of a plurality of distance measurement devices arranged in a second array in the detection device.

In a second aspect of the embodiments of the present disclosure, there is provided an apparatus for remotely measuring a size of a pupil, including: a detection unit configured to acquire an image of a to-be-measured person and measure a distance between the to-be-measured person and the detection device, wherein the image of the to-be-measured person contains an image of a pupil of the to-be-measured person; and a calculation unit configured to calculate an actual size of the pupil of the to-be-measured person based on the measured distance and the image of the pupil of the to-be-measured person.

In a third aspect of the embodiments of the present disclosure, there is provided an electronic device, including: one or more processors; and a memory for storing one or more computer programs, wherein the one or more programs, when executed by the one or more processors, cause the one or more processors to implement the method described according to the first aspect.

In a fourth aspect of the embodiments of the present disclosure, there is provided a computer-readable storage medium having executable instructions stored thereon, wherein the instructions, when executed by a processor, cause the processor to implement the method described according to the first aspect.

BRIEF DESCRIPTION OF THE DRAWINGS

The above-mentioned and other embodiments and features of the present disclosure will become more apparent by describing the embodiments of the present disclosure in detail with reference to the accompanying drawings.

DETAILED DESCRIPTION OF EMBODIMENTS

Figure 1:
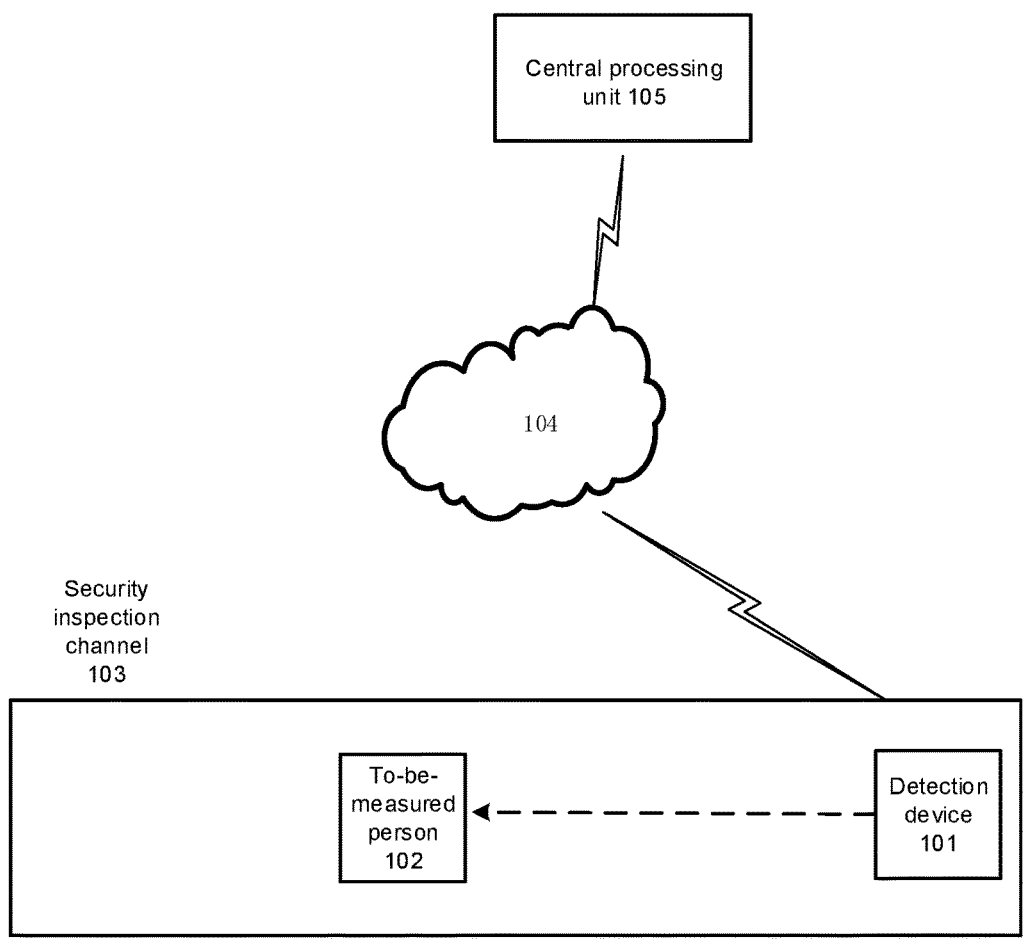
FIG. 1 schematically shows a system architecture of a method of determining a drug-taking based on pupil according to the embodiments of the present disclosure.

Specific embodiments of the present disclosure will be described in detail below. It should be noted that the embodiments described here are only used for exemplification and are not used to limit the present disclosure. In the following description, a number of specific details are set forth in order to provide a thorough understanding of the present disclosure. However, it will be apparent to those of ordinary skilled in the art that these specific details are not necessary to implement the present disclosure. In other examples, in order to avoid confusion with the present disclosure, well-known circuits, materials or methods are not specifically described.

Throughout the specification, references to "one embodiment," "an embodiment," "one example," or "an example" mean that a specific feature, structure, or characteristic described in conjunction with the embodiment or example is included in at least one embodiment of the present disclosure. Therefore, the phrases "in one embodiment", "in an embodiment", "one example" or "an example" appearing in various places throughout the specification do not necessarily refer to the same embodiment or example. Further, specific features, structures or characteristics may be combined in one or more embodiments or examples in any suitable combination and/or sub-combination.

It should be understood that when an element is referred to as being "coupled to" or "connected to" another element, it may be directly coupled or connected to the other element, or there may be an intermediate element. However, when an element is described as being "directly coupled to" or "directly connected to" another element, no intermediate element is present.

In addition, the term "and/or" as used here includes any and all combinations of one or more related listed items.

It should be understood that a noun in a singular form corresponding to a term may include one or more things, unless the relevant context clearly indicates otherwise. As used herein, each of the phrases such as "A or B", "at least one of A and B", "at least one of A or B", "A, B or C", "at least one of A, B and C" and "at least one of A, B, or C" may include all possible combinations of items listed in the corresponding phase of the plurality of phrases. As used herein, terms such as "first" and "second" may be used to simply distinguish a corresponding component from another component and not to limit the components in other aspects (for example, importance or order).

As used herein, the term "module" may include a unit implemented in hardware, software, or firmware, and may be interchanged with other terms (for example, "logic", "logic block", "part" or "circuit"). A module may be a single integrated component adapted to perform one or more functions or a smallest unit or part of the single integrated component. For example, according to the embodiments, the module may be implemented in the form of an application specific integrated circuit (ASIC).

It should be understood that the various embodiments of the present disclosure and the terms used therein are not intended to limit the technical features set forth herein to specific embodiments, but include various changes, equivalents, or alternatives to the corresponding embodiments. Unless explicitly defined otherwise herein, all terms will give their broadest possible interpretations, including the meanings implied in the specification and those understood by those skilled in the art and/or defined in dictionaries, papers, etc.

In addition, those of ordinary skilled in the art should understand that the accompanying drawings provided herein are for the illustrative purpose, and the figures are not necessarily drawn to scale. For the description of the drawings, similar reference numerals may be used to refer to similar or related elements. The present disclosure will be exemplarily described below with reference to the accompanying drawings.

The embodiments of the present disclosure provide a method of determining a drug-taking based on pupil and a device of implementing the method. In this way, it is possible to remotely and imperceptibly determine a suspicion of drug-taking in a safe and simple manner. The method of determining the drug-taking based on pupil may include: acquiring an image of a to-be-measured person by using a detection device; calculating an actual size of the pupil of the to-be-measured person at least partially based on an image of a pupil in the image of the to-be-measured person; and determining whether the to-be-measured person has taken drugs at least partially based on the actual size of the pupil of the to-be-measured person.

The present disclosure will be described below in detail with reference to the accompanying drawings and in conjunction with specific embodiments.

FIG. 1 schematically shows a system architecture of a method of determining a drug-taking based on pupil according to the embodiments of the present disclosure.

The system architecture shown in FIG. 1 is a system architecture in a security inspection scenario, but those skilled in the art should understand that the system architecture is only for illustrative purposes and does not have any limitation. The method according to the present disclosure may be applied to any suitable system architecture.

The system architecture 100 may include a detection device 101, a to-be-measured person 102, a security inspection channel 103, a network 104, and a central processing unit 105.

The detection device 101 may acquire information related to the to-be-measured person 101, for the central processing unit 105 to determine whether the to-be-measured person has taken drugs.

In an exemplary embodiment, the detection device 101 may acquire an image of a pupil of a to-be-measured person entering the security inspection channel 103, and transmit the image of the pupil to the central processing unit 105 via the network 104 in order to make a determination.

In an exemplary embodiment, the detection device 101 may acquire a distance between the to-be-measured person and the detection device 101.

In another exemplary embodiment, the detection device 101 may acquire a body temperature of the to-be-measured person.

In another exemplary embodiment, the detection device 101 may further acquire any appropriate data, which will not be repeated here.

In FIG. 1, a detection device 1 is shown as being located in front of the to-be-measured person entering the security inspection channel 103. However, in other exemplary embodiments, a plurality of detection devices 1 may be arranged at any suitable position such as a left side, a right side or a rear side of the security inspection channel 103.

The central processing unit 105 may be configured to process an information acquired by the detection device 101, so as to determine whether the to-be-measured person has taken drugs.

A detailed operation of determining whether the to-be-measured person has taken drugs by using the central processing unit 105 will be discussed in detail below.

The central processing unit 105 may include a processor (not shown), a memory (not shown), a communication module (not shown), and the like.

The processor of the central processing unit 105 may be configured to receive the relevant information of the to-be-measured person from the detection device 101, and then determine whether the to-be-measured person has taken drugs based on the received information.

The memory of the central processing unit 105 may store data and instructions related to determining whether the to-be-measured person has taken drugs or not. For example, the memory of the central processing unit 105 may store an eye image of the to-be-measured person, the distance between the to-be-measured person and the detection device 101, a height of the to-be-measured person, an information indicating that whether the to-be-measured person has a drug-taking history, a name of the to-be-measured person, an identification number of the to-be-measured person, and other appropriate information.

The communication module in the central processing unit 105 may support an establishment of a direct (for example, wired) communication channel or a wireless communication channel between the central processing unit 105 and an external electronic device (for example, the detection device 101), and perform communication via the established communication channel.

The communication module may include one or more communication processors capable of independently operating with a processor (for example, an application processor (AP)), and support wired communication and/or wireless communication. According to the embodiments of the present disclosure, the communication module may include a wireless communication module (for example, a cellular communication module, a short-distance wireless communication module, or a global navigation satellite system (GNSS) communication module) or a wired communication module (for example, a local area network (LAN) communication module or a power line communication (PLC) module). A corresponding one of these communication modules may communicate with the external electronic device via a first network (for example, a short-distance communication network such as Bluetooth, Wi-Fi direct connection or Infrared Data Association (IrDA)) or a second network (for example, a long-distance communication network such as a cellular network, the Internet, or a computer network (for example, LAN or wide area network (WAN)). These various types of communication modules may be implemented as a single component (e.g., a single chip), or these various types of communication modules may be implemented as a plurality of components (e.g., a plurality of chips) separated from each other. The wireless communication module may identify and verify an electronic device in the communication network (such as the first network or the second network) by using user information (for example, International Mobile Subscriber Identity (IMSI)) stored in a user identification module.

In addition, the central processing unit 105 may further include a display, a microphone, etc., to display or broadcast a measurement result for the to-be-measured person and any other relevant information.

In FIG. 1, the central processing unit 105 and the detection device 101 are shown as separate devices, but those skilled in the art should understand that the central processing unit 105 and the detection device 101 may be integrated as a whole (for example, the central processing unit 105 may be integrated in the detection device 101).

Figure 2:
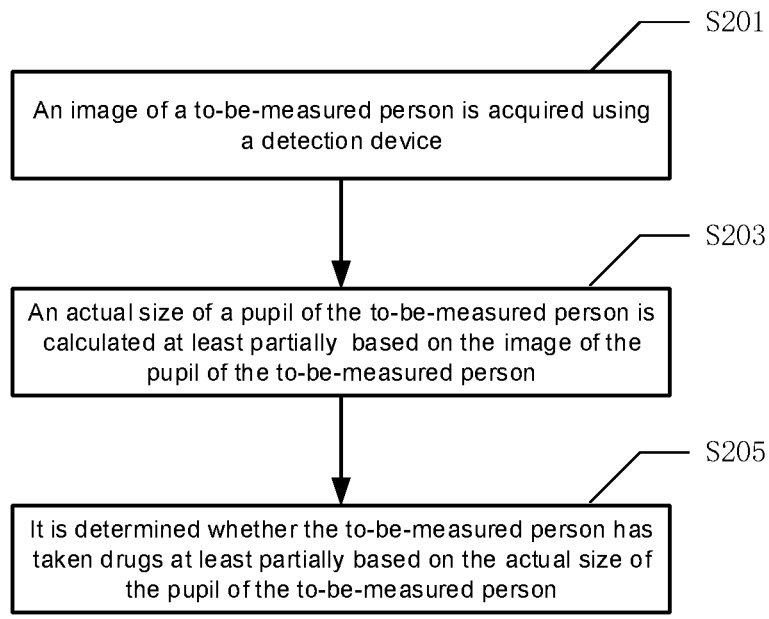
FIG. 2 schematically shows a flowchart of a method of determining a drug-taking based on pupil according to the embodiments of the present disclosure.

FIG. 2 schematically shows a flowchart of a pupil-based method of determining a drug-taking according to the embodiments of the present disclosure.

As shown in FIG. 2, the method includes following operations.

In operation S201, an image of a to-be-measured person is acquired using a detection device.

In an exemplary embodiment, an image of an entire body of the to-be-measured person may be acquired using the detection device, then an image of an eye may be intercepted from the image of the entire body, and then an image of a pupil may be obtained from the image of the eye.

In an exemplary embodiment, the image of the eye of the to-be-measured person may be directly acquired using a far-infrared camera, so as to obtain the image of the pupil of the to-be-measured person.

In an exemplary embodiment, a plurality of image capture devices may be provided on the detection device, so as to acquire pupil images of to-be-measured persons with different heights.

In an exemplary embodiment, the plurality of image capture devices may be arranged in a form of an array.

In an example, the plurality of image capture devices may be arranged in a diamond pattern.

In an example, the plurality of image capture devices may be arranged in a rectangular matrix including a plurality of rows and a plurality of columns.

In an example, the plurality of image capture devices may be arranged in any regular or irregular pattern.

In operation S203, the central processing unit 105 calculates an actual size of the pupil of the to-be-measured person at least partially based on the image of the pupil of the to-be-measured person.

In operation S205, the central processing unit 105 determines whether the to-be-measured person has taken drugs or not at least partially based on the actual size of the pupil of the to-be-measured person.

The present disclosure proposes a more convenient and imperceptible method of determining a drug-taking, which may be used to remotely and imperceptibly test the to-be-measured person, so that manpower and material resources may be saved.

Figure 3:
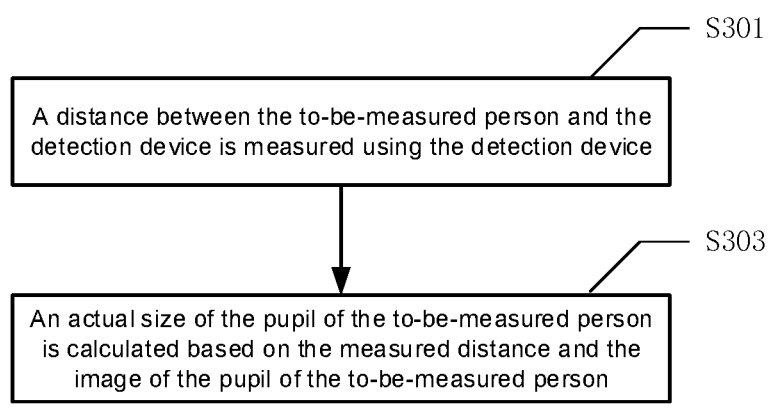
FIG. 3 schematically shows a flowchart of calculating an actual size of the pupil of a to-be-measured person according to the embodiments of the present disclosure.

FIG. 3 schematically shows a flowchart of calculating the actual size of the pupil of the to-be-measured person according to the embodiments of the present disclosure.

As shown in FIG. 3, the method includes following operations.

In operation S301, a distance between the to-be-measured person and the detection device is measured using the detection device.

In an exemplary embodiment, a plurality of distance measurement devices may be arranged in the detecting device, so as to measure various types of distances between the to-be-measured person and the detection devices.

In an example, the plurality of distance measurement devices may be arranged in an up-and-down manner to measure a real distance between the to-be-measured person and the detection device, so as to preventing an inaccurate distance measurement due to the luggage carried by the to-be-measured person or deliberate obstruction by the to-be-measured person.

In other examples, the distance measurement device may be arranged as needed.

In operation S303, an actual size of the pupil of the to-be-measured person is calculated based on the measured distance and the image of the pupil of the to-be-measured person.

In an exemplary embodiment, the number of pixels (or a size of pixels or a ratio of pixels) occupied by the image of the pupil in an entire image is calculated based on the image of the pupil of the to-be-measured person, and then the actual size of the pupil of the to-be-measured person is determined based on the number/size of pixels occupied by the image of the pupil and the distance between the to-be-measured person and the detection device.

In an exemplary embodiment, a to-be-measured object i of a certain height is measured using the detection device, and a distance X1 and a distance X2 between the detection device and the to-be-measured object at different positions (for example, a first position and a second position) may be measured. At the same time, the images of the to-be-measured object at the above-mentioned different positions may be acquired.

The size of pixels occupied by the image of the pupil of the to-be-measured object in the image corresponding to the distance X1 is calculated as P1, and the size of pixels occupied by the image of the pupil of the to-be-measured object in the image corresponding to the distance X2 is calculated as P2.

Then, a linear fitting may be performed on the distance and a ratio of the actual size of the pupil to the size of pixels occupied by the image of the pupil, and Equation (1) may be obtained.

$$y=a*x+b \qquad \text{Equation (1)}$$

where y represents the ratio of the actual size of the pupil to the size of pixels occupied by the image of the pupil, and x represents the distance.

According to Equation (1), the ratio of the actual size of the pupil of the to-be-measured person to the size of pixels occupied by the image of the pupil of the to-be-measured person is proportional to the distance.

In a case that the actual size of the pupil of the to-be-measured object is known, parameters a and b in Equation (1) may be calculated based on the distance X1 between the detection device and the to-be-measured object at the first position, the size P1 of pixels occupied by the image of the pupil in the image corresponding to the first position, the distance X2 between the detection device and the to-be-measured object at the second position, and the size P2 of pixels occupied by the image of the pupil in the image corresponding to the second position.

In a case that the parameters a and b are known, the actual size of the pupil of the to-be-measured person may be obtained by measuring the distance between the to-be-measured person and the detection device and the size of pixels occupied by the image of the pupil in the entire image.

It should be noted that a size of the image of the to-be-measured person (that is, the number of pixels contained in the image) is constant.

Figure 4:
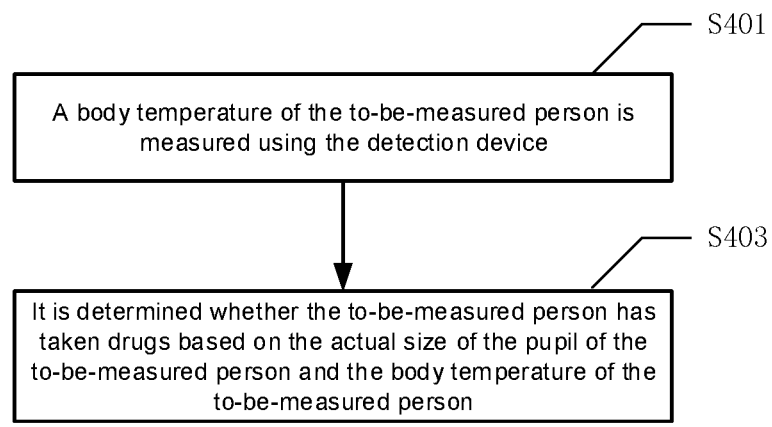
FIG. 4 schematically shows a flowchart of determining whether a to-be-measured person has taken drugs or not according to the embodiments of the present disclosure.

FIG. 4 schematically shows a flowchart of determining whether the to-be-measured person has taken drugs or not according to the embodiments of the present disclosure.

As shown in FIG. 4, the method includes following operations.

In operation S401, a body temperature of the to-be-measured person is measured using the detection device.

In an exemplary embodiment, a separate temperature measurement device may be installed on the detection device.

In another embodiment, the image capture unit or the distance measurement device on the detection device may be integrated with a temperature measurement function.

In operation S403, it is determined whether the to-be-measured person has taken drugs based on the actual size of the pupil of the to-be-measured person and the body temperature of the to-be-measured person.

In an exemplary embodiment, a pre-stored determination model may be used to determine whether the to-be-measured person has taken drugs based on the actual size of the pupil of the to-be-measured person and the body temperature of the to-be-measured person.

In an exemplary embodiment, the determination model may be any determination model adopted by existing or future technologies.

Figure 5:
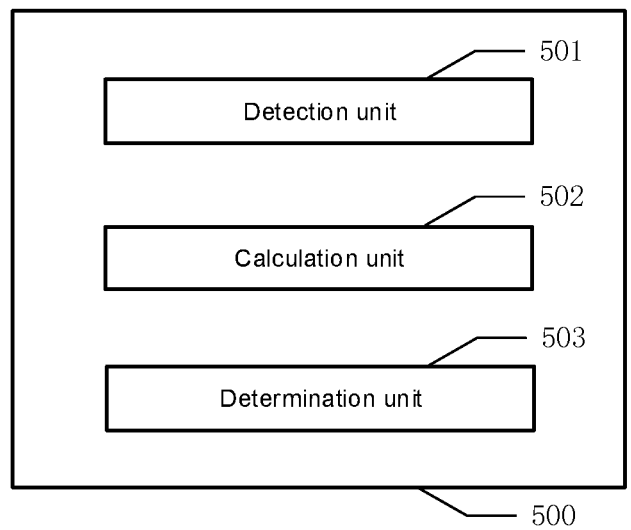
FIG. 5 schematically shows a block diagram of an apparatus for determining a drug-taking based on pupil according to the embodiments of the present disclosure.

FIG. 5 schematically shows a block diagram of an apparatus 500 for determining a drug-taking based on pupil according to the embodiments of the present disclosure.

As shown in FIG. 5, the apparatus 500 for determining a drug-taking based on pupil may include a detection unit 501, a calculation unit 502, and a determination unit 503.

The detection unit 501 may be configured to acquire an image of a to-be-measured person.

The calculation unit 02 may be configured to calculate an actual size of the pupil of the to-be-measured person at least partially based on an image of a pupil in the image of the to-be-measured person.

The determination unit 503 may be configured to determine whether the to-be-measured person has taken has taken drugs at least partially based on the actual size of the pupil of the to-be-measured person.

In addition to the units 501, 502 and 503 described above, the pupil-based device of determining the drug-taking may further include other units used to correspondingly perform various operations described above.

Moreover, in addition to the above-mentioned operations performed by the units 501, 502 and 503 described above, the units 501, 502 and 503 may further perform any suitable operation.

In addition, the present disclosure further provides a device with a redundant image capture capability and a redundant distance measurement capability, so that different humans may be measured using different image acquisition modules and distance measurement modules, and a measurement accuracy may be improved.

Figure 6:
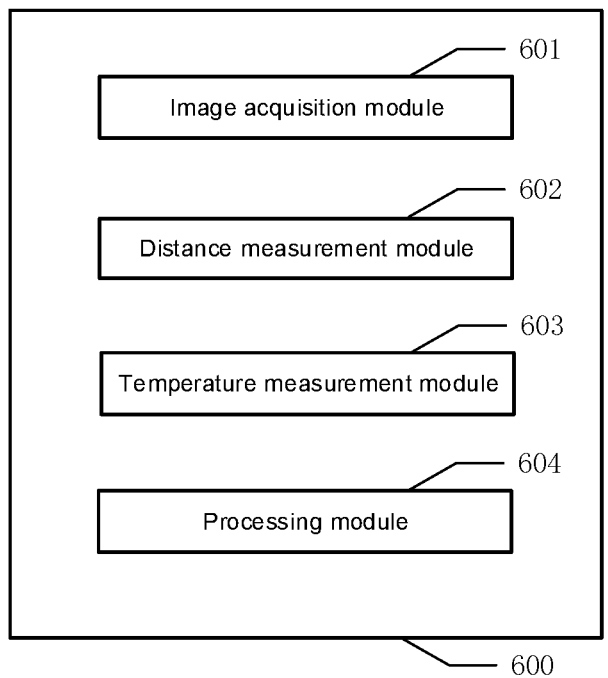
FIG. 6 schematically shows a block diagram of a detection device according to the embodiments of the present disclosure.

FIG. 6 schematically shows a block diagram of a detection device 600 according to the embodiments of the present disclosure.

As shown in FIG. 6, the detection device 600 may include an image acquisition module 601, a distance measurement module 602, a temperature measurement module 603, and a processing module 604.

The image acquisition module 601 may be arranged in a first array and configured to acquire an image of the to-be-measured person.

In an exemplary embodiment, the first array may be implemented in a diamond pattern.

In another exemplary embodiment, the first array may be implemented in a rectangular pattern including a plurality of rows and a plurality of columns.

In other exemplary embodiments, the first array may be implemented in any suitable regular or irregular pattern.

The distance measurement module 602 may be arranged in a second array and configured to acquire a distance between the to-be-measured person and the detection device.

In an exemplary embodiment, the first array may be implemented in a form which is the same as or different from that of the second array.

In an exemplary embodiment, the first array may be implemented in form of a straight line from top to bottom.

The temperature measurement module 603 may be configured to acquire a body temperature of the to-be-measured person.

The processing module 604 may be configured to calculate an actual size of the pupil of the to-be-measured person based on the image of the pupil in the image of the to-be-measured person and the distance between the to-be-measured person and the detection device; and determine whether the to-be-measured person has taken drugs based on the body temperature of the to-be-measured person and the actual size of the pupil of the to-be-measured person.

In addition to the modules 601, 602 and 604 described above, the detection device 600 may further include other modules used to correspondingly perform various operations described above.

For the sake of clarity and conciseness, the various modules and the corresponding operations executed therein will not be repeated here.

The functions of the plurality of modules according to the embodiments of the present disclosure may be implemented in one module. Any module according to the embodiments of the present disclosure may be split into a plurality of modules for implementation. Any module according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way of integrating or encapsulating the circuit, or may be implemented by any one of the three implementation modes of software, hardware and firmware or an appropriate combination thereof. Alternatively, any module according to the embodiments of the present disclosure may be at least partially implemented as a computer program module that, when executed, perform the corresponding functions.

According to the embodiments of the present disclosure, at least one of the modules described above may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way of integrating or encapsulating the circuit, or may be implemented by any one of the three implementation modes of software, hardware and firmware or an appropriate combination thereof. Alternatively, at least one of the modules described above may be at least partially implemented as a computer program module that, when executed, may perform the corresponding functions.

Figure 7:
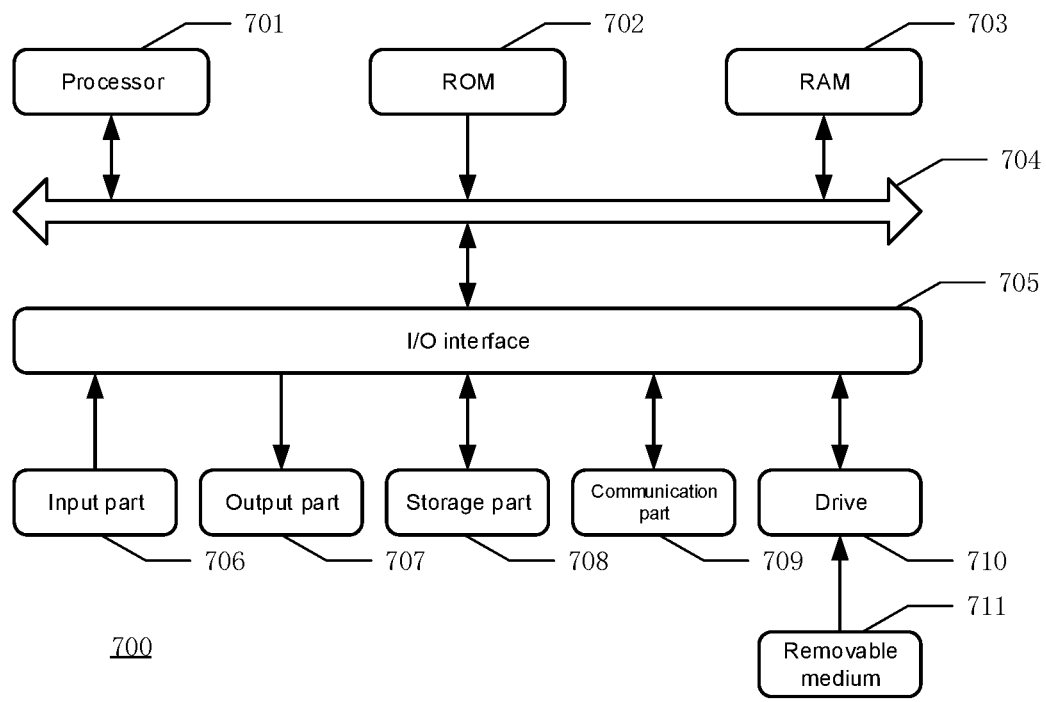
FIG. 7 schematically shows a block diagram of an electronic device suitable for implementing the method of determining the drug-taking based on pupil according to the embodiments of the present disclosure.

FIG. 7 schematically shows a block diagram of an electronic device suitable for implementing the pupil-based method of determining a drug-taking according to the embodiments of the present disclosure.

The electronic device shown in FIG. 7 is only an example, and should not bring any limitation to the function and scope of use of the embodiments of the present disclosure.

As shown in FIG. 7, an electronic device 700 according to the embodiments of the present disclosure includes a processor 701, which may execute various appropriate actions and processing according to the program stored in a read only memory (ROM) 702 or the program loaded into a random access memory (RAM) 703 from a storage section 708. The processor 701 may, for example, include a general-purpose microprocessor (for example, CPU), an instruction set processor and/or a related chipset and/or a special-purpose microprocessor (for example, an application specific integrated circuit (ASIC)), and the like. The processor 701 may further include an on-board memory for caching purposes. The processor 701 may include a single processing unit or a plurality of processing units for executing different actions of the method flow according to the embodiments of the present disclosure.

Various programs and data required for the operation of the electronic device 700 are stored in the RAM 703. The processor 701, the ROM 402 and the RAM 703 are connected to each other through a bus 704. The processor 701 executes various operations of the method flow according to the embodiments of the present disclosure by executing the programs in the ROM 702 and/or the RAM 703. It should be noted that the program may also be stored in one or more memories other than the ROM 702 and the RAM 703. The processor 701 may also execute various operations of the method flow according to the embodiments of the present disclosure by executing the programs stored in the one or more memories.

According to the embodiments of the present disclosure, the electronic device 700 may further include an input/output (I/O) interface 705 which is also connected to the bus 704. The electronic device 700 may further include one or more of the following components connected to the I/O interface 705: an input part 706 including a keyboard, a mouse, etc.; an output part 707 including a cathode ray tube (CRT), a liquid crystal display (LCD), etc. and a speaker, etc.; a storage part 708 including a hard disk, etc.; and a communication part 709 including a network interface card such as a LAN card, a modem, and the like. The communication part 709 performs communication processing via a network such as the Internet. A drive 810 is further connected to the I/O interface 705 as required. A removable medium 811, such as a magnetic disk, an optical disk, a magneto-optical disk, a semiconductor memory, and the like, is installed on the drive 810 as required, so that the computer program read therefrom is installed into the storage part 708 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication part 709, and/or installed from the removable medium 811. When the computer program is executed by the processor 701, the above-mentioned functions defined in the system of the embodiments of the present disclosure are performed. According to the embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or exist alone without being assembled into the apparatus/device/system. The above-mentioned computer-readable storage medium may carry one or more programs that when executed, implement the method according to the embodiments of the present disclosure.

According to the embodiments of the present disclosure, the computer-readable storage medium may be a non-transitory computer-readable storage medium that, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device. For example, according to the embodiments of the present disclosure, the computer-readable storage medium may include the ROM 702 and/or the RAM 703 described above and/or one or more memories other than the ROM 702 and the RAM 703.

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the various embodiments may not be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of determining whether a person has taken drugs, comprising:
    acquiring an image of a person using a detection device;
    acquiring an image of a pupil of the person from the image of the person;
    measuring a distance between the person and the detection device using the detection device;
    calculating an actual size of the pupil of the person based on the measured distance and a size of pixels occupied by the image of the pupil of the person in the image of the person;
    measuring a body temperature of the person by using the detector; and
    determining whether the person has taken drugs based on the actual size of the pupil of the person and the body temperature of the person.

2. The method of claim 1, wherein a ratio of the actual size of the pupil of the person to the size of pixels occupied by the image of the pupil of the person in the image of the person is proportional to the measured distance.

3. The method of claim 1, wherein the image of the pupil is acquired by at least one of a plurality of cameras arranged in a first array in the detection device.

4. The method of claim 1, wherein the distance between the person and the detection device is acquired by at least one of a plurality of distance measurement devices arranged in a second array in the detection device.

5. An electronic device, comprising:
    one or more processors; and
    a memory for storing one or more computer programs, wherein the one or more programs, when executed by the one or more processors, cause the one or more processors to implement the method of claim 1.

6. A non-transitory computer-readable storage medium having executable instructions stored thereon, wherein the instructions, when executed by a processor, cause the processor to implement the method of claim 1.

\* \* \* \* \*